Aug. 4, 1959 R. C. SIEBERT 2,898,115

AUTOMATIC INTER-MIX RECORD PLAYER

Filed Aug. 4, 1952 3 Sheets-Sheet 1

Inventor
Raymond C. Siebert
by Hill, Sherman, Meroni, Gross & Simpson Attys

AUTOMATIC INTER-MIX RECORD PLAYER

Filed Aug. 4, 1952

3 Sheets-Sheet 2

Inventor
Raymond C. Siebert
by Hill, Sherman, Meroni, Gross & Simpson
Attys

AUTOMATIC INTER-MIX RECORD PLAYER

Filed Aug. 4, 1952

Inventor
Raymond C. Siebert
by Hill, Sherman, Meroni, Gross & Simpson Attys 2,898,115

AUTOMATIC INTER-MIX RECORD PLAYER

Raymond C. Siebert, Park Ridge, Ill., assignor, by mesne assignments, to Warwick Manufacturing Corporation, Chicago, Ill., a corporation of Delaware Application August 4, 1952, Serial No. 302,507

10 Claims. (Cl. 274—10)

This invention relates to an automatic record player and more particularly to an automatic record player arranged to play inter-mixed records of different sizes automatically in series.

According to this invention, a fairly conventional drop-type record changer is provided with means for automatically feeling and determining the size of records dropped and controlling the inward swing of the tone arm in accordance therewith. Although this invention is illustrated herein in connection with a drop-type record changer and is particularly advantageous in combination with such a record changer, it will be understood that the principles of this invention may be applied to various other types of automatic record players.

At the present time, commercial records are being sold in large quantities in 7 inch, 10 inch and 12 inch sizes and the automatic player of this invention is arranged to play the three sizes inter-mixed and in any desired order. It will be understood, of course, that the invention is not limited to these three sizes or even to three different sizes since the principles of this invention, as will appear, can be applied to record players for playing two different sizes of records or four or more different sizes of records.

By this invention, a feeler member is disposed in the path of larger sized records fed to record playing means including a tone arm and means controlled by the feeler member determine the inward swing of the tone arm so that reproduction of each record will start at the beginning thereof regardless of the size of the record. According to a particular feature of this invention, means are provided for frictionally resisting movement of the feeler during the time when records are fed so that the feeler is retained in the position to which moved and for a period long enough for the inward swing of the tone arm to be determined in accordance therewith. In accordance with another feature, means are provided for actuating the feeler to the operative position in the path of records being fed in timed relation to the operation of the record feeding means.

In accordance with a still further feature of this invention, the feeler is normally hidden within an ornamental housing and is moved outwardly therefrom only during the period in which records are being changed. Means are provided for frictionally resisting the movement of the feeler so that it will be retained in the position to which moved long enough for the tone arm to be moved inwardly the correct distance.

A further feature of the present invention resides in the provision of novel and highly advantageous means for swinging the tone arm inwardly to the exact positions required for the various sizes of records. By this invention, a plurality of separate members, which are herein levers, are operative to move the tone arm inwardly to different positions and, by restricting operation of one or more of the levers, the swing of the tone arm is precisely determined.

Other features of the present invention lie in the particular construction and correlation of the various parts so that they can be readily manufactured and assembled and, at the same time, they are very efficient and reliable in operation.

It is an object of this invention, accordingly, to provide an automatic record player with improved means for automatically determining record size and positioning the tone arm in accordance therewith.

Another object of this invention is in the provision of improved means for automatically determining the size of records fed to record playing means.

A further object of this invention is to provide improved means for moving a tone arm inwardly to different accurately determined positions.

This invention contemplates other objects, features and advantages which will become more fully apparent from the following detailed description taken in conjunction with the accompanying drawings which illustrate a preferred embodiment and in which.

Figures 1, 2:
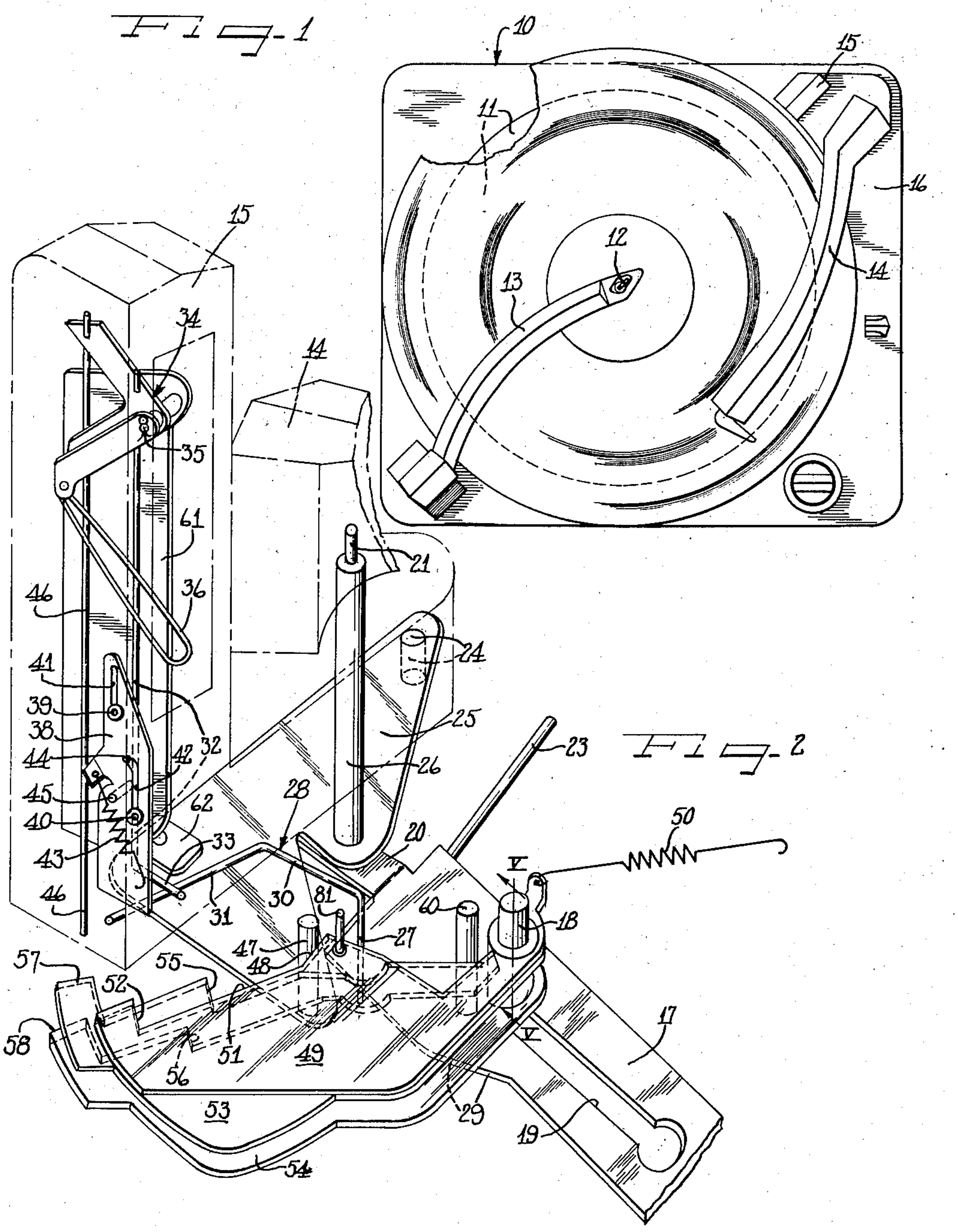
Figure 1 is a general and overall perspective view of an automatic record player embodying record size determining and tone arm positioning means according to the principles of this invention.
Figure 2 is a perspective view illustrating the details of the record size determining and tone arm positioning means of this invention with certain parts broken away and others in tandem.

As shown in Figure 1, a record player 10 constructed according to this invention may include a turntable 11, a center post 12 arranged to support and drop records seriatim to the turntable 11, a record stack-steadying arm 13, a tone arm 14 and record size determining means in a housing 15, all of which are supported from a main base plate 16. The center post 12 may be of any desired construction and may preferably be constructed in a manner as disclosed in my copending application entitled "Record Changer Center Post," Serial No. 242,445, and filed August 18, 1951.

Figure 2 is a perspective view of the essential parts of the record size determining and tone arm positioning mechanism with the housing 15 and tone arm 14 in broken lines and with the base plate 16 and other parts not shown for the purpose of clarity. Referring thereto, a plate 17 is reciprocably mounted by means including a fixed post 18 extending through a slot 19 therein. This plate 17 is actuated by means not illustrated and not forming any part of the present invention from the initial position illustrated upwardly into the left in Figure 2 and then back to the initial position illustrated during each record changing cycle.

It is believed that the invention will be more quickly and thoroughly understood by first describing the sequence of operation of the essential parts and then describing the construction and assembly, the more salient features, and the possible variations in detail.

*Sequence of operation*

When the tone arm 14 reaches a position at the end of a record, or when a manual reject device (not shown) is actuated, a cycling mechanism (also not shown) is set into operation and the plate 17 is moved outwardly (to the upper left, Figure 2) and the following operations take place:

(1) The tone arm 14 is raised by means of a cam portion 20 of the plate 17 which engages and raises a pin 21 which, in turn, engages a part of the tone arm 14.

(2) The tone arm is then moved toward a position outside the turntable 11 by a spring wire 23 affixed to the plate 17 which engages a pin 24 depending from a plate 25 affixed to a shaft 26 which carries the tone arm.

(3) Toward the end of the outward movement of the plate 17 and the outward swinging movement of the tone arm 14, a depending leg 27 of a bell crank lever wire 28 rides on a cam portion 29 of the plate 17 to allow the lever wire 28 to pivot about an intermediate portion 30 thereof and to lower a second leg portion 31 thereof which results in the following operation:

(*a*) A wire 32 having an in-turned lower end portion 33 engaging the leg 31 is allowed to lower by gravity to swing a lever assembly 34 about a mounting pin 35 and to project a feeler 36 mounted on the lever assembly 34 inwardly and upwardly into the path of records released to the turntable 11.

(*b*) A plate 38 which is mounted for vertical movement by pins 39 and 40 extending through slots 41 and 42 respectively, therein and which is thrust downwardly by a spring 43 against the portion 31 of the bell crank lever wire 28, then reaches the end of its downward travel whereupon the pin 40 engages in a widened portion 44 of the slot 42 and allows the plate 38 to pivot about the pin 39 under the influence of spring 43. Thereupon a pin 45 affixed to the plate 38 frictionally engages a part of the wire 32 for the purpose of retaining the wire 32 and the lever assembly 34 in any position into which they may be moved by a record engaging feeler 36.

(4) Record changing mechanism is then actuated to allow records to drop to the turntable 11 and engage and move the feeler 36. If the record dropped is a small size (7 inches) the feeler 36 is not engaged but if the record is of a larger size (10 or 12 inches) the feeler will be engaged and moved downwardly depending on the size of the record. The position in which the feeler is disposed after a record is dropped controls the position of a rod or wire 46 secured to the lever assembly 34 and which, in turn, controls the inward swing of the tone arm 14 as will appear.

(5) As the tone arm is swung to its extreme outward position by the wire 23 engaging the depending pin 24, an upstanding pin 47 on the plate 25 engages a cam face 48 of a lever 49 pivoted on the fixed post 18. Through a mechanism which will be described in detail hereinafter, the lever 49 is then released to swing about the post 18 under the influence of a spring 50 and a cam surface 51 of the lever 49 engages the upstanding pin 47 to move the tone arm 14 inwardly. The lever 49 has a stop shoulder 52 and a pair of levers 53 and 54, also pivotal on the post 18 and frictionally clutched to the lever 49, have stop shoulders 55 and 56, respectively, all engageable with the upstanding pin 47 to determine the extent of inward swing of the tone arm.

If a 7 inch rod is dropped, the feeler 36 will be in its inwardly and upwardly projecting position and the wire rod 46 will be in its lowermost position which will be in the path of edges 57 and 58 of the levers 53 and 54, respectively, to prevent movement of the levers 53 and 54. When the lever 49 is then moved inwardly under the influence of the spring 50, the tone arm will be cammed inwardly by the cam surface 51 until the stop shoulder 52 engages the upstanding pin 47. The tone arm will then be positioned for playing the 7 inch rod. When a 10 inch record is dropped, the feeler 36 will be moved downwardly and the wire rod 46 will be moved upwardly out of the path of the edge 58 of the lever 54. When the lever 49 is then moved inwardly under the influence of spring 50, the lever 54 will be moved inwardly therewith while the movement of the lever 53 is prevented and the tone arm will be moved inwardly by the cam surface 51 until the pin 47 engages the stop shoulder 56 of the lever 54. The tone arm will then be positioned for playing a 10 inch record.

When a 12 inch record is dropped to the turntable 11, the feeler 36 will be moved to a lower position and the wire rod 46 will be moved upwardly out of the path of both surfaces 57 and 58 of levers 53 and 54, respectively. When the lever 49 is then moved inwardly by the spring 50, all three levers 49, 53 and 54 will move together, and the pin 47 will be cammed by the cam surface 51 until engaged by the stop shoulder 55 of the lever 53. The tone arm will then be in a position for playing a 12 inch record.

After the tone arm has been moved inwardly to the correct position relative to the record which has been dropped, the actuating plate 17 then starts on its return movement inwardly (toward the lower right, Figure 2) and the tone arm raise and lower pin 21 will be lowered so that the tone arm is lowered to effect reproduction of the record. At the same time, the bell crank lever wire 28 is moved by the cam surface 29 of the actuating plate 17 to the position illustrated in Figure 2 to raise the wire 32, lever assembly 34 and plate 38 to the position illustrated in Figure 2. Also, a pin 60 upstanding from the actuating plate 17 engages all three of the levers 49, 53 and 54 to return them to the position illustrated in Figure 2 against the action of the spring 50. The lever 49 is then latched in position by a mechanism which will be hereinafter described in detail. This, of course, completes the cycle of operation.

*Record size determining mechanism in detail*

Figures 3, 4:
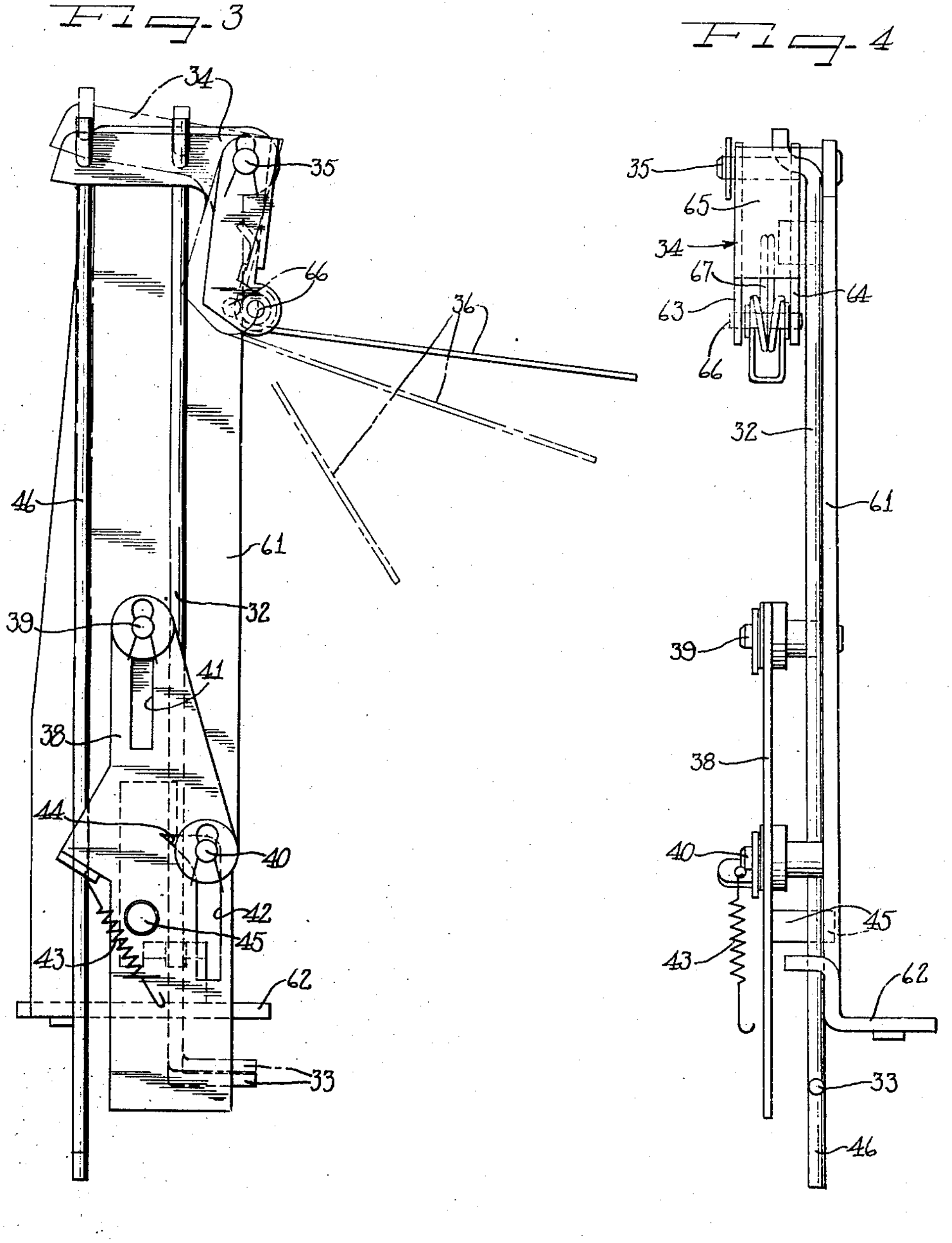
Figure 3 is a side elevational view of a part of the record size determining structure of this invention.
Figure 4 is a front elevational view of the structure of Figure 3.

This mechanism is illustrated in detail in Figures 3 and 4. Referring thereto the parts of this mechanism are all mounted on a support plate 61 having a lower inturned flange 62 by which it may be mounted on the main base plate 16. The pivot pin 35 for the lever assembly 34 and the support pins 39 and 40 for the plate 38 are, of course, affixed to this plate 61.

The lever assembly 34 comprises a one-piece sheet metal member of a generally L-shape with one leg of the L formed by spaced portions 63 and 64 separated by a portion 65. The pivot pin 35, of course, extends through both of the spaced portions 63 and 64 and the feeler 36 is pivotally supported on a pin 66 affixed between the portions 63 and 64. This feeler 36 preferably is formed from a single piece of wire which is doubled on itself and then wound around the mounting pin 66 to provide ends 67 which may engage the portion 65 of the lever assembly 34 to limit pivotal movement of the feeler 36 relative to the lever assembly 34 in one direction (clockwise in Figure 3) while allowing free movement in the reverse direction so as to prevent damage to the mechanism. The other leg of the L-shaped lever 34 has a pair of openings through which the upper ends of the wire rods 32 and 46 may extend by appropriate bending of the same as better illustrated in Figure 4.

In Figures 3 and 4, the full line position of the lever assembly 34 and associated parts is that in which it is disposed prior to records being dropped to the turntable. The broken line position is the position in which these parts will be moved when a 10 inch record has been dropped to the turntable 11. It will be noted that in this position the wire rod 46 is elevated and to such an extent as to be out of the path of the lever 54, Figure 2, while in the path of the lever 53.

The braking plate 38, in the position as illustrated in Figure 3, is not in operative position. However, it will be clear from this figure that the spring 43 can readily pivot the braking plate 38 about the pin 39 since the pin 40 can engage in the enlarged portion 44 of the slot 42 and hence the pin 45 can be frictionally engaged with the wire rod 32 to retain the same and the lever assembly 34 in any position to which they are moved by a record being dropped to the turntable 11.

The record size determining mechanism is herein used to control the tone arm positioning through the lever mechanism including levers 49, 53 and 54. However, it will be clear that the record size determining mechanism as described might be used directly to stop or control the positioning of the tone arm. Further, although the feeler 36 is normally positioned out of the path of records fed to the turntable, it will be clear that the feeler 36 could normally be in the path of records and return to that normal position at the end of each record changing cycle. The arrangement as used herein is preferred since the feeler is normally within the housing 15 thus protecting the mechanism from damage as well as improving the ornamental appearance thereof. In any event, it will be clear that this mechanism is very efficient and durable and at the same time, it can be readily and economically manufactured and assembled.

*Tone arm positioning mechanism detail and latching means therefor*

Figure 5:
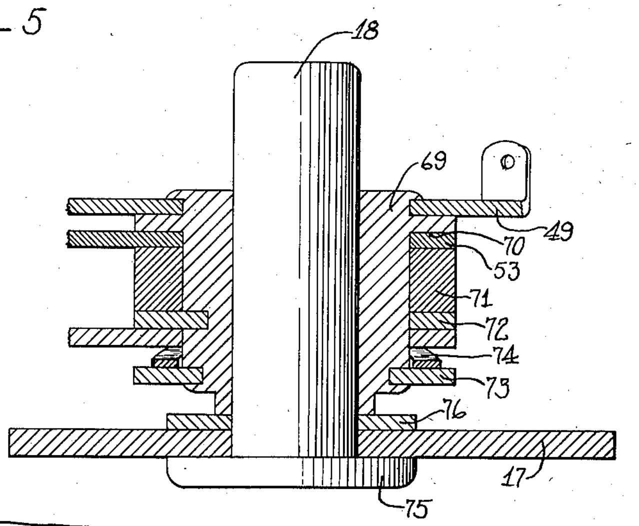
Figure 5 is a sectional view on an enlarged scale taken substantially along lines V—V of Figure 2.

The pivotal support of the levers 49, 53 and 54 on the post 18 is an important feature of the present invention since it allows both the 12 inch lever 53 and the 10 inch lever 54 to be frictionally carried with the 7 inch lever 49, movement of the 10 inch lever 54 only with 7 inch lever 49 or movement of the 7 inch lever 49 alone. Figure 5 is a sectional view through the pivotal support post 18 and shows a sleeve 69 to which the 7 inch lever 49 is rigidly secured. The 12 inch lever 53 is pivotally journaled on the sleeve 69 between a support shoulder 70 thereof and a spacer washer 71, relative movement of the lever 53 relative to the sleeve 69 being resisted through the action of a friction washer 72 which clamps the lever 53 between the shoulder 70 and the spacer washer 71. The 10 inch lever 54 is held in a similar fashion between the friction washer 72 and the washer 73 affixed to the sleeve 69 with a spring washer 74 being disposed between the fixed washer 73 and the 10 inch lever 54.

It may be noted that the actuating plate 17 is journaled at the lower end of the post 18 between a hub portion 75 and a washer 76. Hence the post 18 performs a dual function.

Figure 6:
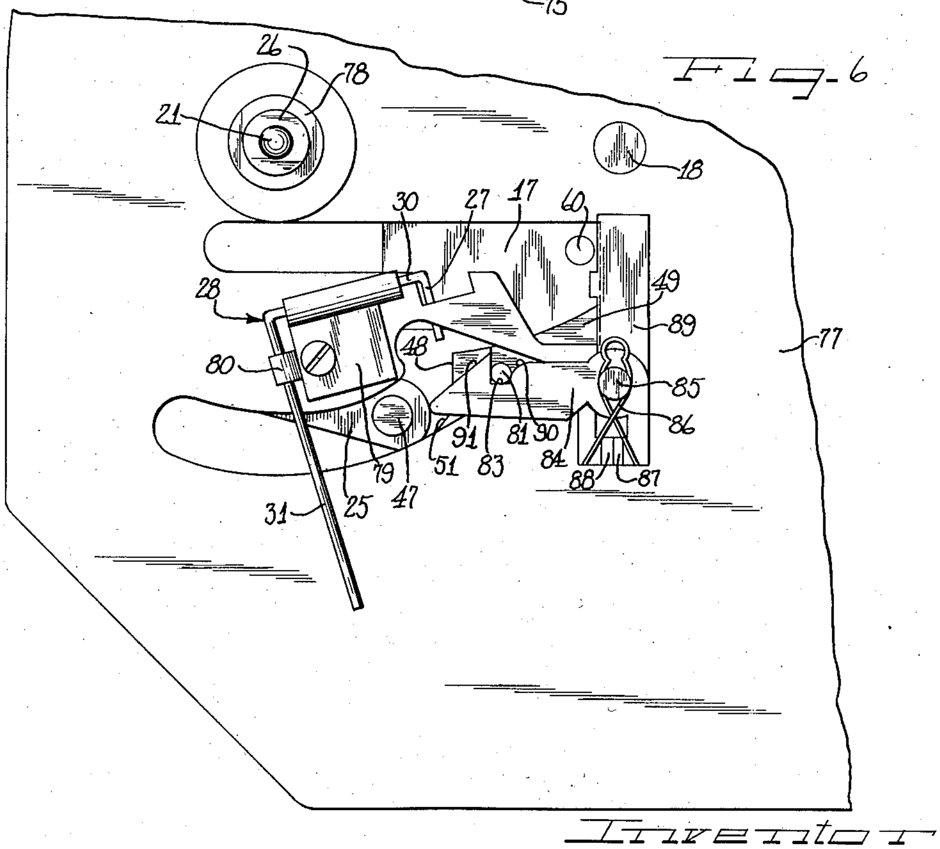
Figure 6 is a top plan view of a portion of the structure of this invention with the main base plate and other parts removed for the purposes of clarity.

As described above, the positioning levers are normally latched in the position illustrated in Figure 2. For this purpose, mechanism as illustrated in Figure 6 is provided. In this figure, reference numeral 77 designates a sub-base plate which is disposed beneath the main base plate 16 and which was not shown in Figure 2 for clarity. This plate 77 carries a sleeve 78 in which the tone arm support shaft 26 is journaled. The bell crank lever wire 28 is also pivotally supported from the base plate 77 by means of a bracket 79 which has a lug 80 limiting the pivotal movement of the bell crank lever wire 28.

To latch the levers 49, 53 and 54 in the position illustrated in Figure 2, the lever 49 has an upstanding pin 81 affixed thereto and projecting upwardly through an opening 82 in the base plate 77. This pin 81 is normally engaged in a slot 83 in a lever 84 pivoted on a fixed pin 85 and urged in a clockwise direction, of Figure 6, by a hair pin spring 86, the spring 86 engaging an upstanding lug 87 on the lever 84 and also an upstanding lug 88 on a lever 89 pivoted on the pin 85. As previously described, the upstanding pin 47 engages a cam surface 48 of the 7 inch lever 49 at the extreme outer swinging movement of the tone arm 14. When this happens, the pin 81 rides on a cam surface 90 of the lever 84 and pivots the same out of latching position so as to release the lever 49 for movement under the influence of spring 50. After the tone arm is then positioned, the levers 49, 53 and 54 are moved toward the position of Figure 2 by the pin 60 upstanding from the actuating plate 17 and, at the end of this movement, the pin 81 rides on a cam surface 91 of the lever 84 until opposite the slot 83.

It may be noted that the pin 60, in addition to returning the levers 49, 53 and 54, also is normally engaged with the lever 89 to insure that the lever 84 will function to latch the pin 81 and lever 49 while it is out of engagement with the lever 89 during the record changing cycle so that the lever 84 may be moved to and remain in its inoperative position when pin 47 engages cam edge 48 of lever 49.

It will be apparent that this invention provides a record size determining mechanism and a tone arm positioning mechanism which are efficient, rugged and reliable in operation and readily and economically manufactured and assembled.

It will be understood that variations and modifications may be effected without departing from the scope of the novel concepts of the present invention.

I claim as my invention:

1. In an automatic record changer for different sizes of records, record playing means, means for feeding records seriatim to said record playing means, a feeler mounted for movement between an inoperative position out of the path of records fed to said playing means and an operative position in the path of records fed to said playing means and movable to an intermediate position by a certain size record, means for normally maintaining said feeler in the inoperative position, means for moving the feeler to the operative position prior to feeding a record to said record playing means, selectively operable means frictionally resisting movement of said feeler to retain the same in an intermediate position to which moved, and means for actuating said feeler from the intermediate position to which moved into said inoperative position in timed relation to the feeding of records seriatim to said playing means.

2. In an automatic record player, a tone arm, a member rotatable with said tone arm, at least two levers on a common axis, means for actuating said levers, one of said levers having a cam edge engageable with said member to rotate said tone arm, stop means on each lever for engagement with said member in different rotative positions of the tone arm to stop the member, and means for selectively limiting movement of the other lever to permit the stop means on the one lever to engage the member and determine the extent of rotation of the tone arm.

3. In an automatic record player, a tone arm, a turntable, means for moving said tone arm to a position outside said turntable, a lever movable in one direction for moving said tone arm inwardly over said turntable, latch means releasable to allow movement of said lever in said one direction toward a position in which said tone arm is over said turntable, and means for releasing said latch means on movement of said tone arm to the limit of its outward movement.

4. In an automatic record player, a turntable, a tone arm, a member rotatable with said tone arm, and a lever having a cam edge engageable with said member for moving said tone arm inwardly over said turntable and having stop means at one end of said cam edge engageable with said member to limit movement of said lever and inward movement of said tone arm.

5. In an automatic record player, a turntable, a tone arm, a member rotatable with said tone arm, means for moving said tone arm to a position outside said turntable, a lever spring biased in one direction, said lever having a cam edge engageable with said member on movement in said one direction for moving said tone arm inwardly over said turntable and having stop means at one end of said cam edge engageable with said member to limit movement of said lever in said one direction, latch means releasable to allow movement of said lever in said one direction toward a position in which said stop means is engaged with said member, and means for releasing said latch means on movement of said tone arm to the limit of its outward movement.

6. In an automatic record player, a turntable, a tone arm, a member rotatable with said tone arm, means for moving said tone arm to a position outside said turntable, a lever spring biased in one direction, said lever having a cam edge engageable with said member on movement in said one direction for moving said tone arm inwardly over said turntable and having stop means at one end of said cam edge engageable with said member to limit movement of said lever in said one direction, a second lever movable with said lever and having stop means engageable with said member to limit inward movement of said tone arm, and means for selectively limiting movement of said second lever.

7. In an automatic record player, a turntable, a tone arm, a member rotatable with said tone arm, means for moving said tone arm to a position outside said turntable, a lever spring biased in one direction, said lever having a cam edge engageable with said member on movement in said one direction for moving said tone arm inwardly over said turntable and having stop means at one end of said cam edge engageable with said member to limit movement of said lever in said one direction, a second lever pivoted on a common axis with said lever and frictionally connected thereto, stop means on said second lever for limiting inward movement of said tone arm, and means for selectively limiting movement of said second lever.

8. In an automatic record player, a turntable, a tone arm, a member rotatable with said tone arm, means for moving said tone arm to a position outside said turntable, a lever spring biased in one direction, said lever having a cam edge engageable with said member on movement in said one direction for moving said tone arm inwardly over said turntable and having stop means at one end of said cam edge engageable with said member to limit movement of said lever in said one direction, a second lever movable with said lever and having stop means engageable with said member to limit inward movement of said tone arm, a feeler arranged to be moved into the path of records fed to said turntable in timed relation to outward movement of said tone arm, brake means actuatable in timed relation to outward movement of said tone arm for frictionally retaining said feeler in a position to which moved, and means connected to said feeler for limiting movement of said second lever.

9. In an automatic record player, a turntable, a tone arm, a member rotatable with said tone arm, means for moving said tone arm to a position outside said turntable, a movable lever, means for moving said lever, said lever having a cam edge engageable with said member on movement in said one direction for moving said tone arm inwardly over said turntable and having stop means at one end of said cam edge engageable with said member to limit movement of said lever and inward movement of said tone arm, a second lever movable with said lever and having stop means engageable with said member to limit inward movement of said tone arm, a feeler arranged to be moved into the path of records fed to said turntable in timed relation to outward movement of said tone arm, and means connected to said feeler for limiting movement of said second lever.

10. In an automatic record player, a turntable, a tone arm, a member rotatable with said tone arm, means for moving said tone arm to a position outside said turntable, a movable lever, means for moving said lever, said lever having a cam edge engageable with said member on movement in said one direction for moving said tone arm inwardly over said turntable and having stop means at one end of said cam edge engageable with said member to limit movement of said lever and inward movement of said tone arm for a relatively small record, a second lever movable with said lever and having stop means engageable with said member to limit inward movement of said tone arm for a relatively larger record, a feeler arranged to be moved into the path of records fed to said turntable in timed relation to outward movement of said tone arm, a third lever movable with said first lever and having stop means engageable with said member to limit inward movement of said tone arm for an even larger record, and means connected to said feeler for limiting movement of said second and third levers depending upon the size record fed to the turntable.

References Cited in the file of this patent

UNITED STATES PATENTS

| | | |
|---|---|---|
| 2,090,746 | Compare | Aug. 24, 1937 |
| 2,309,352 | Offen | Jan. 26, 1943 |
| 2,330,293 | Knox | Sept. 28, 1943 |
| 2,333,414 | De Tar | Nov. 2, 1943 |
| 2,412,441 | Carson | Dec. 10, 1946 |
| 2,488,260 | Ascoli | Nov. 15, 1949 |
| 2,616,705 | Leonard | Nov. 4, 1952 |
| 2,616,708 | Vivie | Nov. 4, 1952 |
| 2,637,558 | Fisher | May 5, 1953 |
| 2,640,703 | Smith | June 2, 1953 |
| 2,643,129 | Habegger | June 23, 1953 |